(12) United States Patent
Bonwick et al.

(10) Patent No.: US 7,480,684 B2
(45) Date of Patent: Jan. 20, 2009

(54) METHOD AND SYSTEM FOR OBJECT ALLOCATION USING FILL COUNTS

(75) Inventors: Jeffrey S. Bonwick, Los Altos, CA (US); William H. Moore, Fremont, CA (US); Matthew A. Ahrens, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 273 days.

(21) Appl. No.: 11/408,134

(22) Filed: Apr. 20, 2006

(65) Prior Publication Data

US 2007/0106632 A1   May 10, 2007

Related U.S. Application Data

(60) Provisional application No. 60/733,706, filed on Nov. 4, 2005.

(51) Int. Cl.
  G06F 12/00 (2006.01)
  G06F 17/30 (2006.01)
  G06F 9/26 (2006.01)
  G06F 9/34 (2006.01)

(52) U.S. Cl. ........................... 707/205; 711/209

(58) Field of Classification Search ............... 707/205; 711/209
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 5,963,962 A * | 10/1999 | Hitz et al. | 707/202 |
| 6,209,111 B1 | 3/2001 | Kadyk et al. | |
| 6,341,341 B1 | 1/2002 | Grummon et al. | |
| 6,636,879 B1 * | 10/2003 | Doucette et al. | 707/205 |
| 6,745,284 B1 | 6/2004 | Lee et al. | |
| 6,745,305 B2 | 6/2004 | McDowell | |
| 6,795,966 B1 | 9/2004 | Lim et al. | |
| 6,829,617 B2 | 12/2004 | Sawdon et al. | |
| 6,857,001 B2 | 2/2005 | Hitz et al. | |
| 6,892,211 B2 | 5/2005 | Hitz et al. | |

(Continued)

OTHER PUBLICATIONS

"System Administration Guide, vol. 1", Feb. 2000, Sun Microsystems, Chapter 40.*

(Continued)

Primary Examiner—Mohammad Ali
Assistant Examiner—Brannon W Smith
(74) Attorney, Agent, or Firm—Osha·Liang LLP (57) ABSTRACT

A method for locating a root block in file system metadata, includes traversing the file system metadata to locate a leaf block, wherein the leaf block comprises a plurality of root blocks and at least one of the plurality of root blocks is unallocated, allocating the at least of one the plurality of unallocated root blocks to obtain an allocated root block, wherein the leaf block is associated with a fill count and the fill count is less than a maximum fill count of the leaf block.

15 Claims, 8 Drawing Sheets

U.S. PATENT DOCUMENTS

| | | |
|---|---|---|
| 7,007,196 B2 | 2/2006 | Lee et al. |
| 7,032,154 B2 | 4/2006 | Kidorf et al. |
| 7,043,677 B1 | 5/2006 | Li |
| 7,133,964 B2 | 11/2006 | Rodrigues et al. |
| 7,162,486 B2 | 1/2007 | Patel et al. |
| 7,174,352 B2 | 2/2007 | Kleiman et al. |
| 7,200,715 B2 | 4/2007 | Kleiman et al. |
| 2002/0004883 A1 | 1/2002 | Nguyen et al. |
| 2002/0055942 A1 | 5/2002 | Reynolds |
| 2002/0087788 A1 | 7/2002 | Morris |
| 2002/0161972 A1 | 10/2002 | Talagala et al. |
| 2003/0033477 A1 | 2/2003 | Johnson et al. |
| 2003/0126107 A1 | 7/2003 | Yamagami |
| 2003/0145167 A1 | 7/2003 | Tomita |
| 2004/0098720 A1 | 5/2004 | Hooper |
| 2004/0107314 A1 | 6/2004 | Kim et al. |
| 2004/0123063 A1 | 6/2004 | Dalal et al. |
| 2004/0225834 A1 | 11/2004 | Lu et al. |
| 2004/0234000 A1 | 11/2004 | Page |
| 2004/0268068 A1* | 12/2004 | Curran et al. ............... 711/162 |
| 2005/0010620 A1 | 1/2005 | Silvers et al. |
| 2005/0097270 A1 | 5/2005 | Kleiman et al. |
| 2005/0235154 A1 | 10/2005 | Serret-Avila |
| 2006/0168409 A1 | 7/2006 | Kahn et al. |
| 2006/0218644 A1 | 9/2006 | Niles et al. |
| 2006/0256965 A1 | 11/2006 | Rowe |

OTHER PUBLICATIONS

Binu S., "Unix Internals", Jun. 2004 Available online: http://web.archive.org/web/20040610104149/http://www.angelfire.com/myband/binusoman/Unix.html.*

Remy Card et al, "Design and Implementation of the Second Extended Filesystem", 2000 Available online: http://web.archive.org/web/20000824115712/http://e2fsprogs.sourceforge.net/ext2intro.html.*

Ralph Neininger, "Distributed Analysis of Recursive Alogrithms by the Contraction Method", Nov. 1999.*

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track; 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, University of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Goodheart, B. et al.; "The Magic Garden Explained"; Prentice Hall, pp. 24-25, 29-30, 390-391, 1994.

Austin, B. J.; "A Dynamic Disc Allocation Algorithm Designed to Reduce Fragmentation During File Reloading"; pp. 378-381, 1970.

Stallings, W.; "Computer Organization and Architecture: Designing for Performance"; Prentice Hall, pp. 377-378, 2000.

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

* cited by examiner

METHOD AND SYSTEM FOR OBJECT ALLOCATION USING FILL COUNTS

CROSS-REFERENCE TO RELATED APPLICATIONS

This application claims benefit of U.S. Provisional Application Ser. No. 60/733,706 filed on Nov. 4, 2005, entitled "Fill Counts" in the names of William H. Moore, Jeffrey S. Bonwick, and Matthew A. Ahrens, and is hereby incorporated by reference.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828,715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Automatic Conversion of All-Zero Data Storage Blocks into File Holes" (application Ser. No. 10/853,915) filed on May 26, 2004; "Multiple Replication Levels with Pooled Devices" (application Ser. No. 60/733,848) filed on Nov. 4, 2005; and "Method and System for Storing a Sparse file Using Fill Counts" filed on Apr. 19, 2006.

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

Once common operation for a file system is to write a file to disk. Initially, when a new file (i.e., a file not previously written to disk) is to be written to disk, the file system must first assign it a file number. Traditional file systems maintain a bitmap for tracking which file numbers have already been allocated (i.e., are in use). Thus, to allocate a file number for the new file, the file system must traverse the bitmap to locate an unused file number. The file system typically traverses the bitmap in O (n) time, where n is the number of allocated file numbers in the bitmap.

SUMMARY

In general, in one aspect, the inventions relates to a method for locating a root block in file system metadata, comprising traversing the file system metadata to locate a leaf block, wherein the leaf block comprises a plurality of root blocks and at least one of the plurality of root blocks is unallocated, allocating the at least of one the plurality of unallocated root blocks to obtain an allocated root block, wherein the leaf block is associated with a fill count and the fill count is less than a maximum fill count of the leaf block.

In general, in one aspect, the inventions relates to a system, comprising a storage pool comprising file system metadata comprising a leaf block, wherein the leaf block comprises a plurality of root blocks and at least one of the plurality of root blocks is unallocated, a file system configured to: traverse the file system metadata to locate the leaf block, allocate the at least of one the plurality of unallocated root blocks to obtain an allocated root block, wherein the leaf block is associated with a fill count and the fill count is less than a maximum fill count of the leaf block.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and system for allocating an object (e.g., a file) in a file system. More specifically, embodiments of the invention relate to finding an unused root block to associate with a file.

Figure 1:
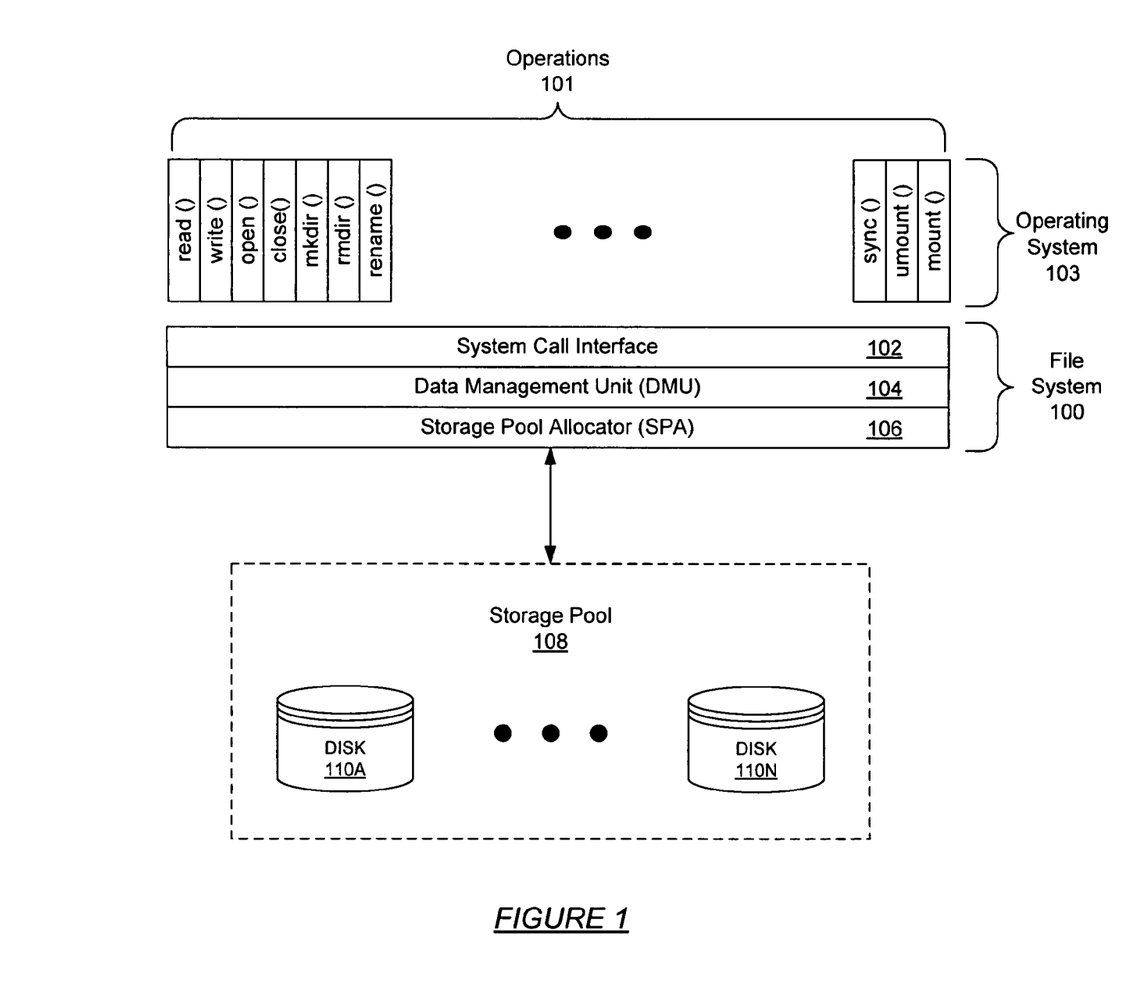
FIG. 1 shows a system architecture in accordance with an embodiment of the invention.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
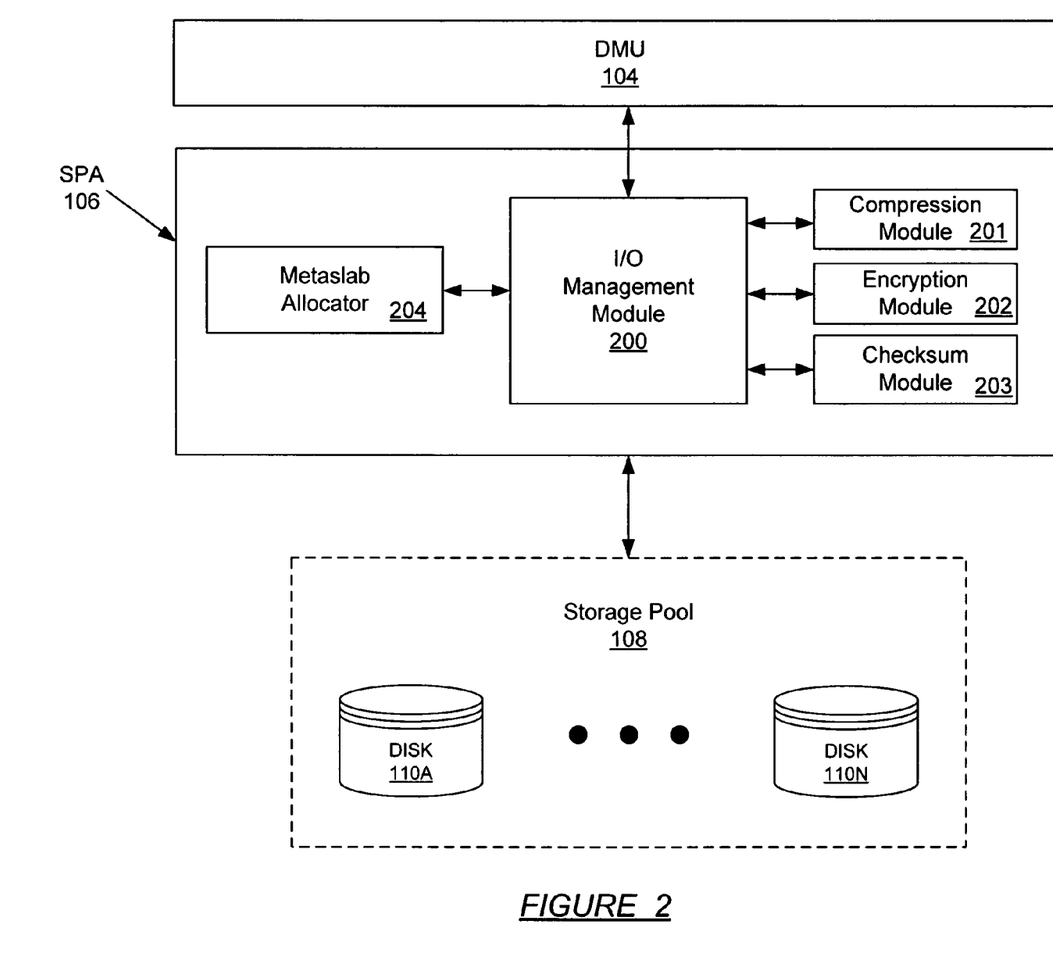
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3:
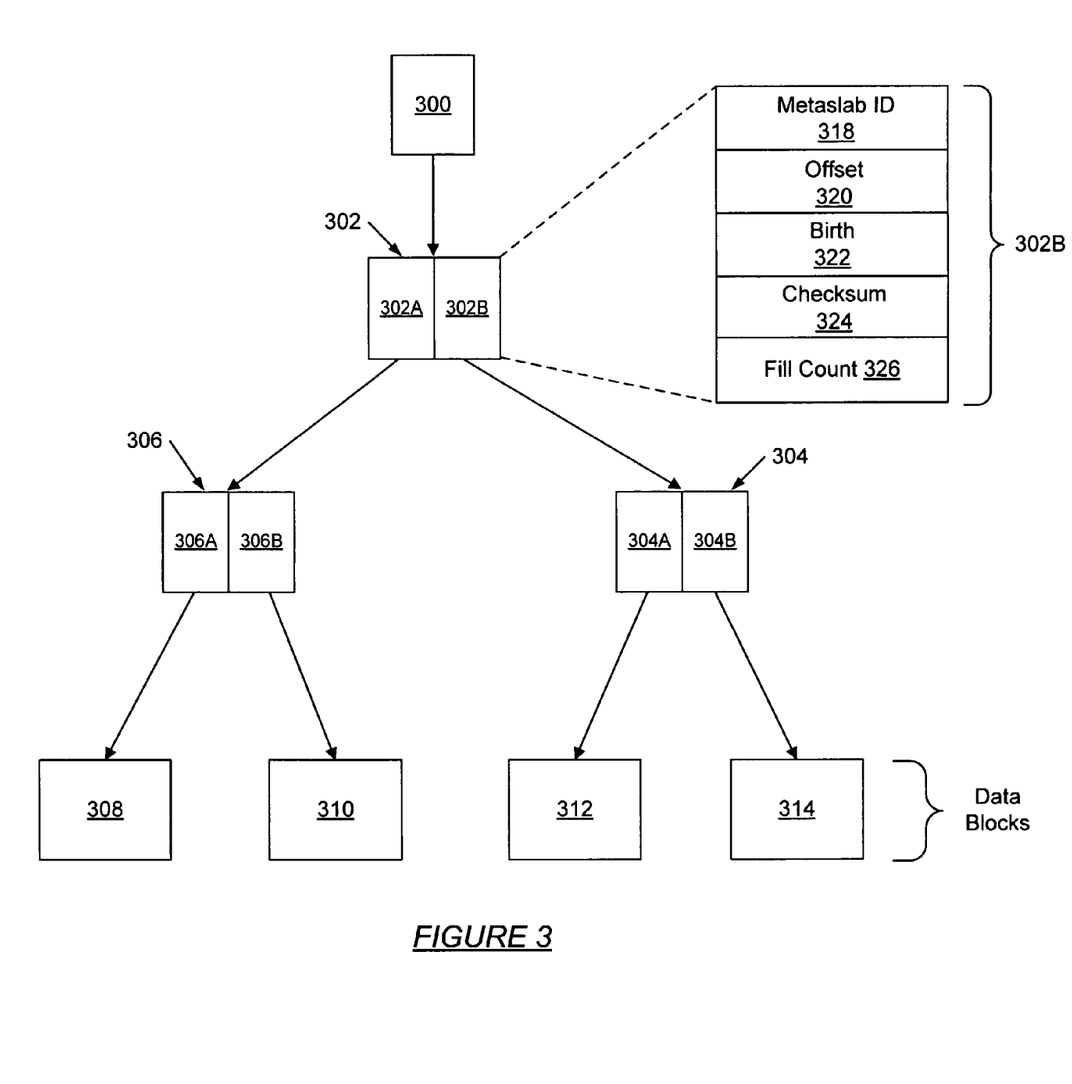
FIGS. 3 and 4 show hierarchical data configurations in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, a checksum (324) of the data stored in the block (data block or indirect block) referenced by the block pointer, and a fill count (326). In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, the fill count (326) is a non-negative integer (i.e., 0, 1, 2, 3, etc.). Further, the fill count (326) recorded in a given indirect block pointer corresponds to either: (i) the sum of the fill counts recorded in all indirect blocks directly referenced by the block pointer or (ii) the number of non-zero data blocks referenced by the block pointer.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Using the infrastructure shown in FIGS. 1-3, the following discussion describes a method for writing metadata (i.e., indirect blocks) based on a replication scheme. Specifically, embodiments of the invention are directed towards replication of data and metadata.

Figure 4:
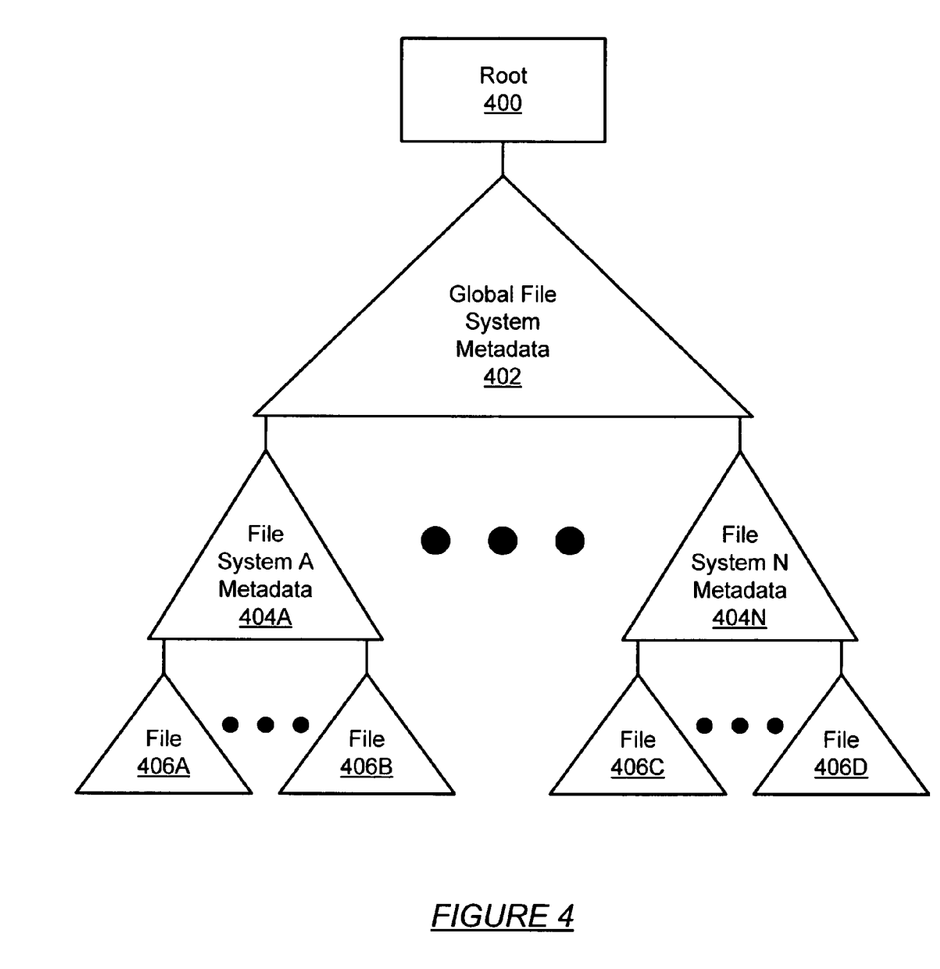

FIG. 4 shows a diagram of a hierarchical data configuration in accordance with one embodiment of the invention. More specifically, FIG. 4 shows a diagram of a hierarchical data configuration for a storage pool including both metadata and files (i.e., data). As shown in FIG. 4, all the metadata and data is stored in the storage pool and is referenced directly or indirectly by a root (400). The root (400) directly references global file system metadata (402). In one embodiment of the invention, the global file system metadata (402) is organized in a hierarchical tree where the root (400) references the root of the global file system metadata (402), and the leaf nodes of the global file system metadata (402) correspond to root nodes (not shown) of the file system metadata (404A, 404N).

In one embodiment of the invention, the file system metadata (404A, 404N) corresponds to metadata associated with the individual file system. In one embodiment of the invention, the file system metadata (404A, 404N) is organized in a hierarchical tree where the leaf nodes of the file system metadata (404A, 404N) correspond to root nodes (not shown) of the individual files (406A, 406B, 406C, 406D). In one embodiment of the invention, each file is organized in a hierarchical tree structure (see, e.g., FIG. 3). Accordingly, in one embodiment of the invention, each file includes additional metadata associated with the file.

Figure 5:
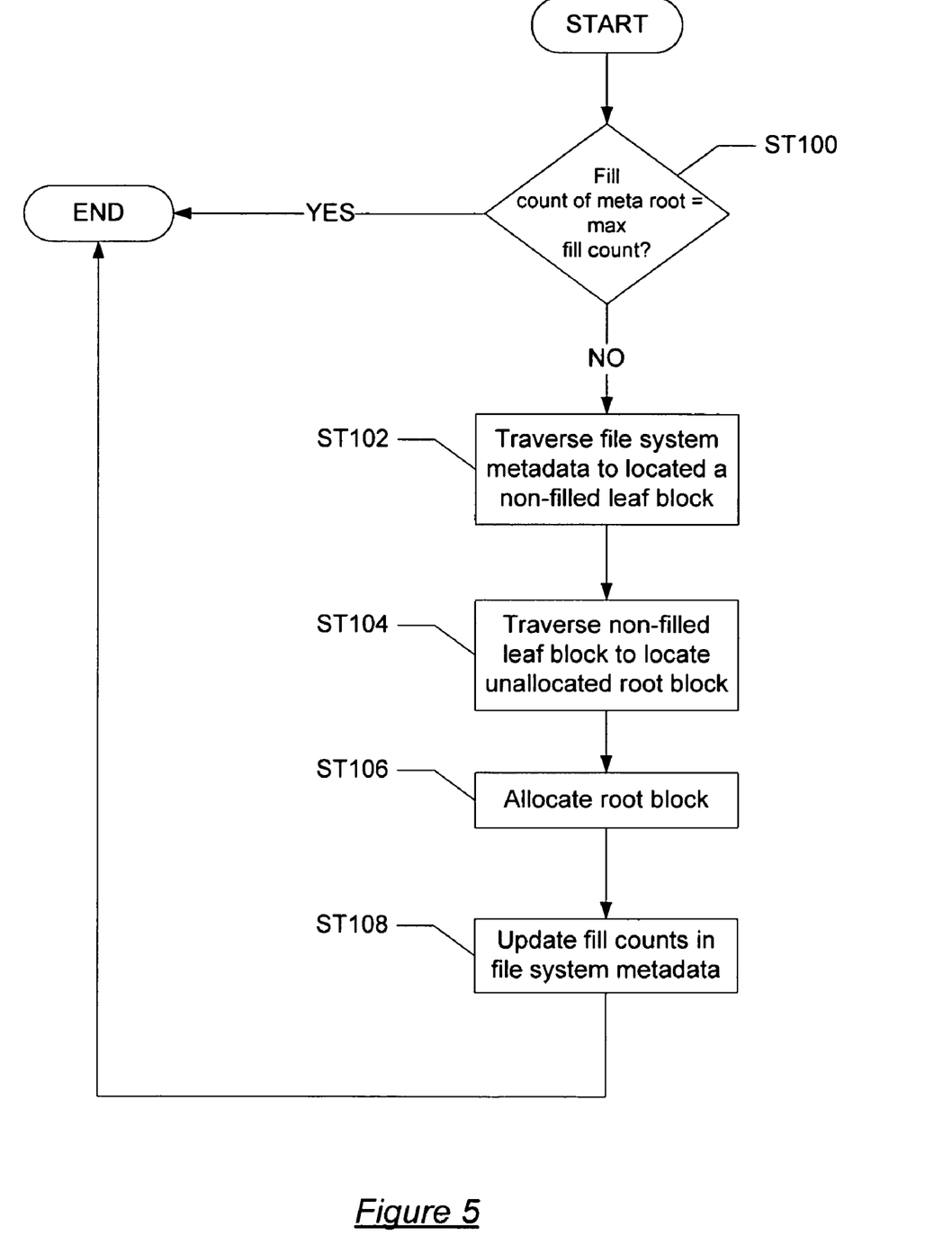
FIG. 5 shows a flow chart in accordance with an embodiment of the invention.

Using the infrastructure shown in FIGS. 1-4, the following discussion describes method for using allocating an unused root block and associating the file with the root block in accordance with one embodiment of the invention. FIG. 5 shows a flowchart in accordance with one embodiment of the invention. More specifically, FIG. 5 shows a method for locating an unused meta leaf block (i.e., roots blocks (e.g., FIG. 3) that not currently associate with a file) in accordance with one embodiment of the invention.

Turning to FIG. 5, once a request to write a new file is received, the file system initiates the method in FIG. 5 to locate an available root block. Initially, a determination is made about whether the fill count of a meta root block (i.e., the root block of the hierarchical tree corresponding to the file system meta data for a particular file system (e.g., 404)) is equal to the maximum fill count for the meta root block (ST100). In one embodiment of the invention, the fill count is equal to the maximum fill count for the meta root block, if all root blocks associated with the meta root block are already allocation (see FIGS. 6A and 6B below).

If the fill count for the meta root block is equal to the maximum fill count, then there are no unallocated root blocks and the process ends (ST100). Said another way, the file may not be stored in the file system associated with the meta root block. If the fill count for the meta root block is not equal to the maximum fill count, then there is one or more unallocated root blocks in the file system and the process proceeds to ST 102.

At ST102, the file system meta data is traversed to locate a non-filled leaf block. In one embodiment of the invention, traversing the file system meta data corresponds to performing a depth traversal of the file system metadata to locate a non-filled leaf block. Those skilled in the art will appreciate that any method for traversing the file system metadata may be used. In one embodiment of the invention, traversing the file system meta data uses the fill counts associated with the various blocks in the file system meta data (e.g., meta root block and meta indirect blocks (see FIGS. 6A and 6B)) to locate a non-filled leaf block.

More specifically, in one embodiment of the invention, the traversal attempts to locate a non-full leaf block in the file system metadata, where the traversal uses the full counts recorded in the block pointers (discussed in FIG. 6A) to determine (i) whether a particular branch in the file system metadata includes a non-full leaf block and (ii) whether a particular leaf block in the file system metadata is full. In one embodiment of the invention, the traversal includes functionality to locate leaf block that are less than 25% full (i.e., less than 25% of the root blocks in the leaf node have been allocated).

Returning to the discussion of FIG. 5, once the non-filled leaf block has been located, the non-filled leaf block is traversed to locate an unused root block (ST104). The root block located in ST104 is subsequently allocated (ST106). Once the root block has been allocated, the fill counts in the file system meta data are updated (ST108). Those skilled in the art will appreciate that the method described in FIG. 5 is performed on a per-file system basis.

Figures 6A, 6B:
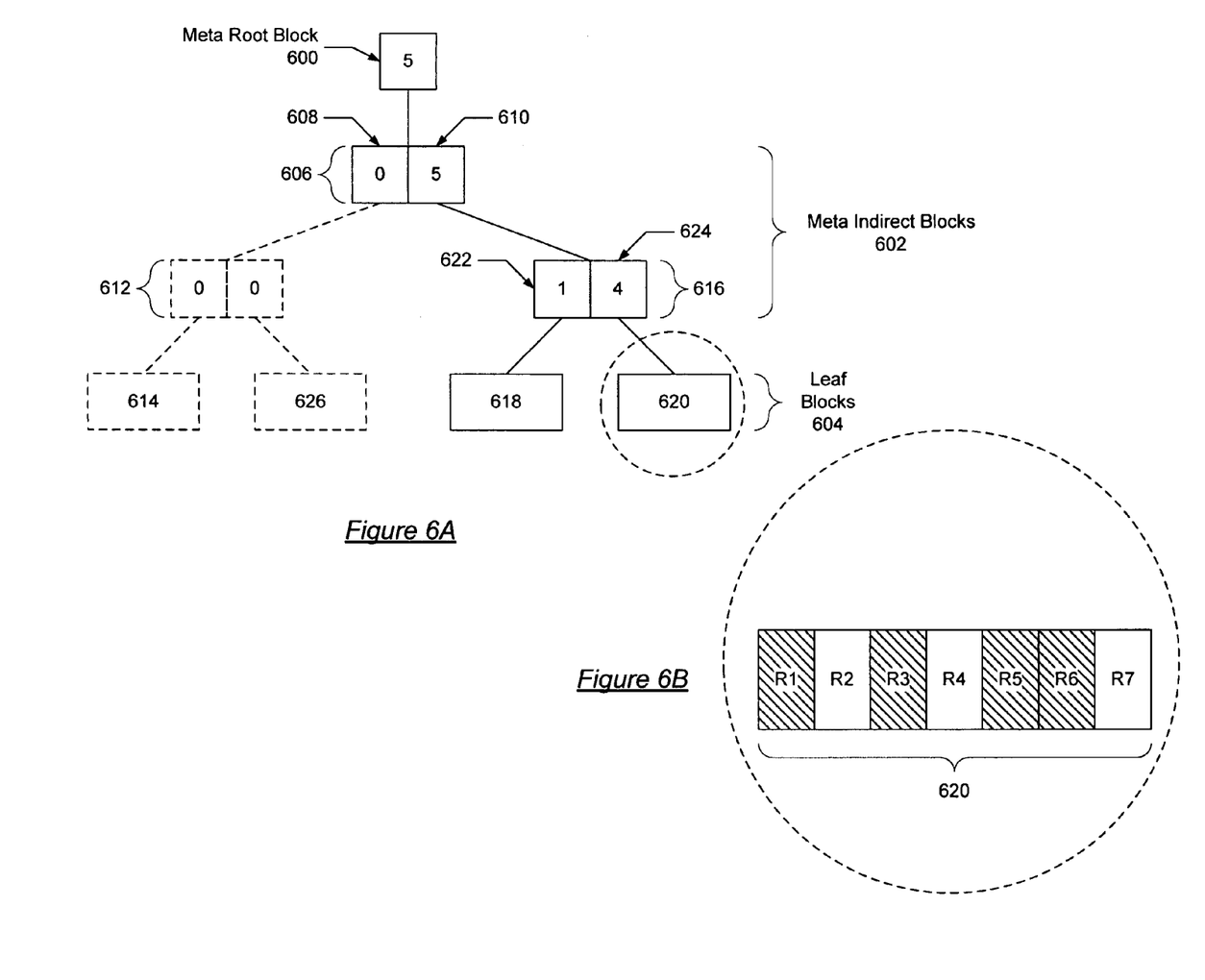
FIGS. 6A and 6B show a file system metadata hierarchical data configuration in accordance with an embodiment of the invention.

FIGS. 6A and 6B show an example of file system metadata hierarchical data configuration in accordance with one embodiment of the invention. As shown in FIG. 6A, the file system metadata is organized into a hierarchical tree. The hierarchical tree includes a meta root block (600), meta indirect blocks (602), and leaf blocks (604). In one embodiment of the invention, the meta root block (600) and the meta indirect blocks (602) each include a block pointer referencing at least one of (i) a meta indirect block or (ii) a leaf block. Further, the meta root block (600) and each of the meta indirect blocks (602) includes a fill count, where the fill count is a non-negative integer (e.g., 0, 1, 2, 3, etc.). The fill count for a meta indirect block directly referencing one or more leaf blocks is corresponds to the number of allocated roots (e.g., R1 . . . R7) in the referenced leaf block(s). The fill count for all other meta indirect blocks (i.e., the meta indirect blocks not directly referencing leaf block) and the meta root block corresponds to the sum of the fill counts for all of the directly referenced indirect meta blocks.

Turing to FIG. 6A, the meta root block (600) directly references indirect meta block (606), which includes block pointer (608) and block pointer (610). Block pointer (608) includes a fill count equal to zero. In one embodiment of the invention, a fill count equal to zero indicates that no root blocks, directly or indirectly, referenced by the block pointer (e.g., block pointer (608)) have been allocated. Further, in one embodiment of the invention, if the block pointer includes a fill count equal to zero, then there are no blocks (indirect meta blocks or leaf blocks) directly or indirectly referenced by the block pointer. Thus, indirect meta block (612) and leaf blocks (614, 626) are no stored in the file system metadata. Those skilled in the art will appreciate that if the file system allocates a root block in leaf block (614) or (626), then the file system meta data is updated to include the necessary meta indirect blocks (e.g., 612).

Unlike block pointer (608), block pointer (610) includes a fill count equal to five. This indicates that five root blocks (e.g., R1, . . . , R7) have been allocated. As shown in FIG. 6A, indirect meta block (610) references indirect meta block (616), where indirect meta block (616) includes two block pointers (622) and (624). The fill count recorded in block pointer (622) is one and the fill count recorded in block pointer (624) is four. Further, block pointer (622) references leaf block (618) and block pointer (624) references leaf block (620). The fill counts recorded in block pointers (622) and (624) indicate that one root block is allocated in leaf block (618) and four root blocks are allocated in leaf block (620).

FIG. 6B shows a leaf block (620) in accordance with one embodiment of the invention. Leaf block (620) includes seven root blocks (R1, . . . , R7) of which four are allocated (i.e., R1, R3, R5, and R6). Assuming that each of the leaf blocks (614, 626, 618, 620) includes seven root blocks, then the maximum fill count for each block pointer in indirect blocks (612) and (622) is seven. Further, the maximum fill count for each block pointer in indirect block (606) is fourteen. Finally, the maximum fill count for the meta root block (600) is twenty eight. In one embodiment of the invention, each leaf block (602) includes 32 root blocks. Further, in one embodiment of the invention, each indirect block includes 128 block pointers.

In one embodiment of the invention, by using the fill counts recorded in the block pointers of the meta root block and meta indirect blocks, the file system can determine the location of an unused root block. Further, maintaining the file system metadata in a hierarchical tree (see FIG. 6A) and recording the fill counts in the block pointers within the file system metadata, the location of a unallocated root block in O (log n) time, where n corresponds to the number of root blocks in the file system meta data.

Once a root block has been allocated, the file system may proceed to write a file to the storage pool, where the root of the hierarchical block configuration corresponding to the file was allocated from the file system metadata as described above.

Figure 7:
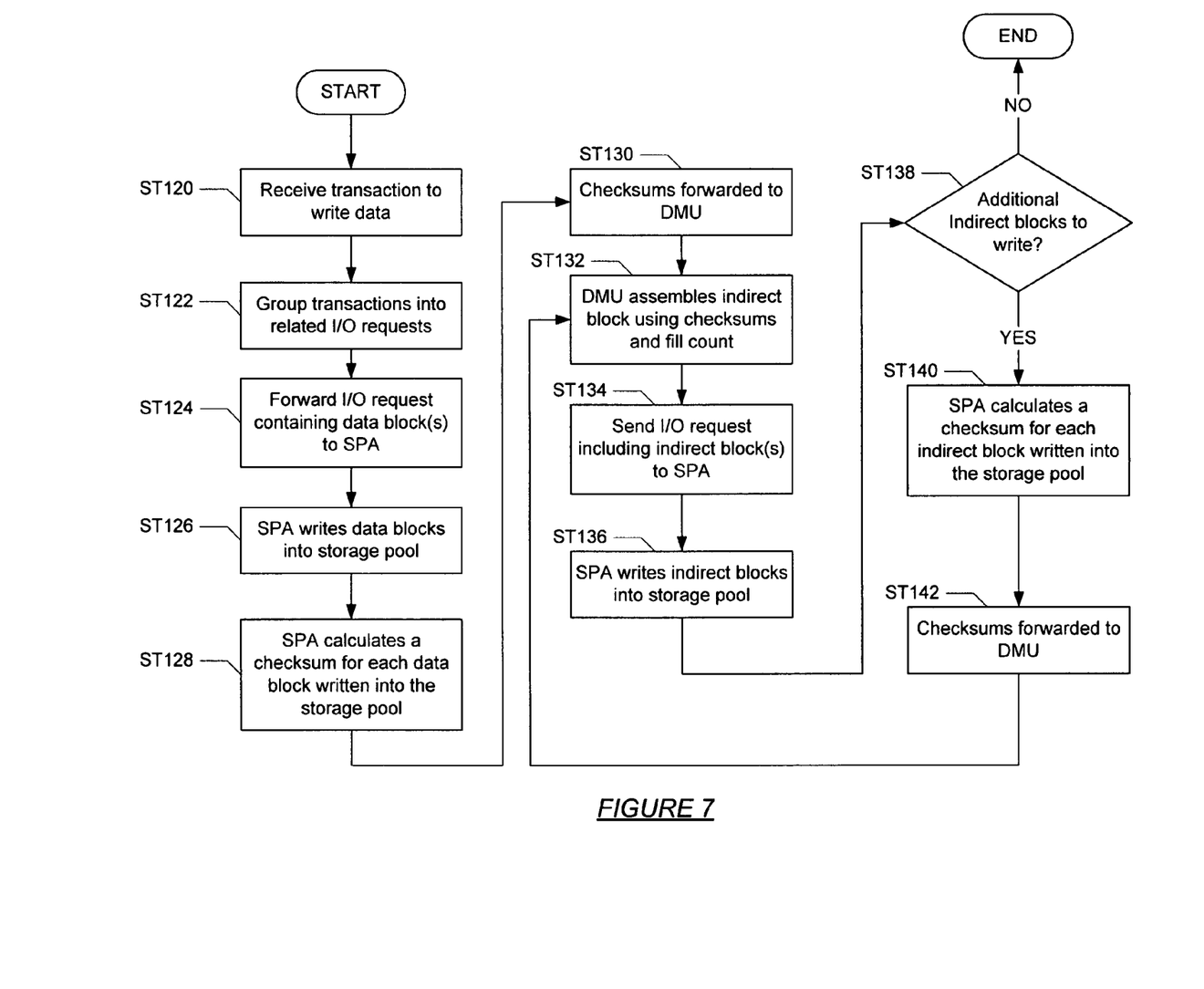
FIG. 7 shows a flow chart in accordance with an embodiment of the invention.

FIG. 7 shows a flow chart in accordance with one embodiment of the invention. Initially, the DMU receives a transaction from an application, the operating system (or a subsystem therein), etc. (ST 120). The DMU subsequently groups the transaction into one or more I/O requests (ST 122). The I/O requests are subsequently forwarded to the SPA (ST 124).

In one embodiment of the invention, the transaction includes one or more data blocks, and/or one or more indirect blocks. As noted above, the file system is stored on disk using a hierarchical structure including data blocks and indirect blocks. Thus, for a given set of transactions, the first I/O request includes the data blocks to be written to disk, while subsequent I/O requests include the corresponding indirect blocks containing one or more block pointers. Accordingly, I/O request referenced in ST 124 includes data blocks.

Continuing with the discussion of FIG. 7, the SPA, upon receiving the I/O request including data blocks from the DMU, writes the data blocks into the storage pool (ST 126). The SPA subsequently calculates a checksum for each data block written into the storage pool (ST 128). In one embodiment, the checksum module (203 in FIG. 2) within the SPA is used to calculate the checksum for each data block written into the storage pool. The checksums are subsequently forwarded to the DMU (ST 130). The DMU then assembles the indirect blocks using the checksums and fill counts (ST 132). Specifically, the DMU places the checksum for a given data block and the fill count in the appropriate block pointer within the indirect block (i.e., the parent indirect block of the data block). In one embodiment of the invention, the fill count is calculated by the DMU. Continuing with the discussion of FIG. 7, next, the indirect blocks are forwarded to the SPA (ST 134). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into the storage pool (ST 136). A determination is then made whether additional indirect blocks exist to write into the storage pool (i.e., whether the last indirect block written to the storage pool corresponds to the root block) (ST 138). If no additional indirect blocks exist, then the method is complete. However, if additional indirect blocks exist, then the SPA calculates the checksum from each of the indirect blocks written into the storage pool (ST 140). The checksums for each of the indirect blocks is subsequently forwarded to the DMU (ST 142). Steps ST 132 through ST 142 are subsequently repeated until the root block is written into the storage pool.

Figure 8:
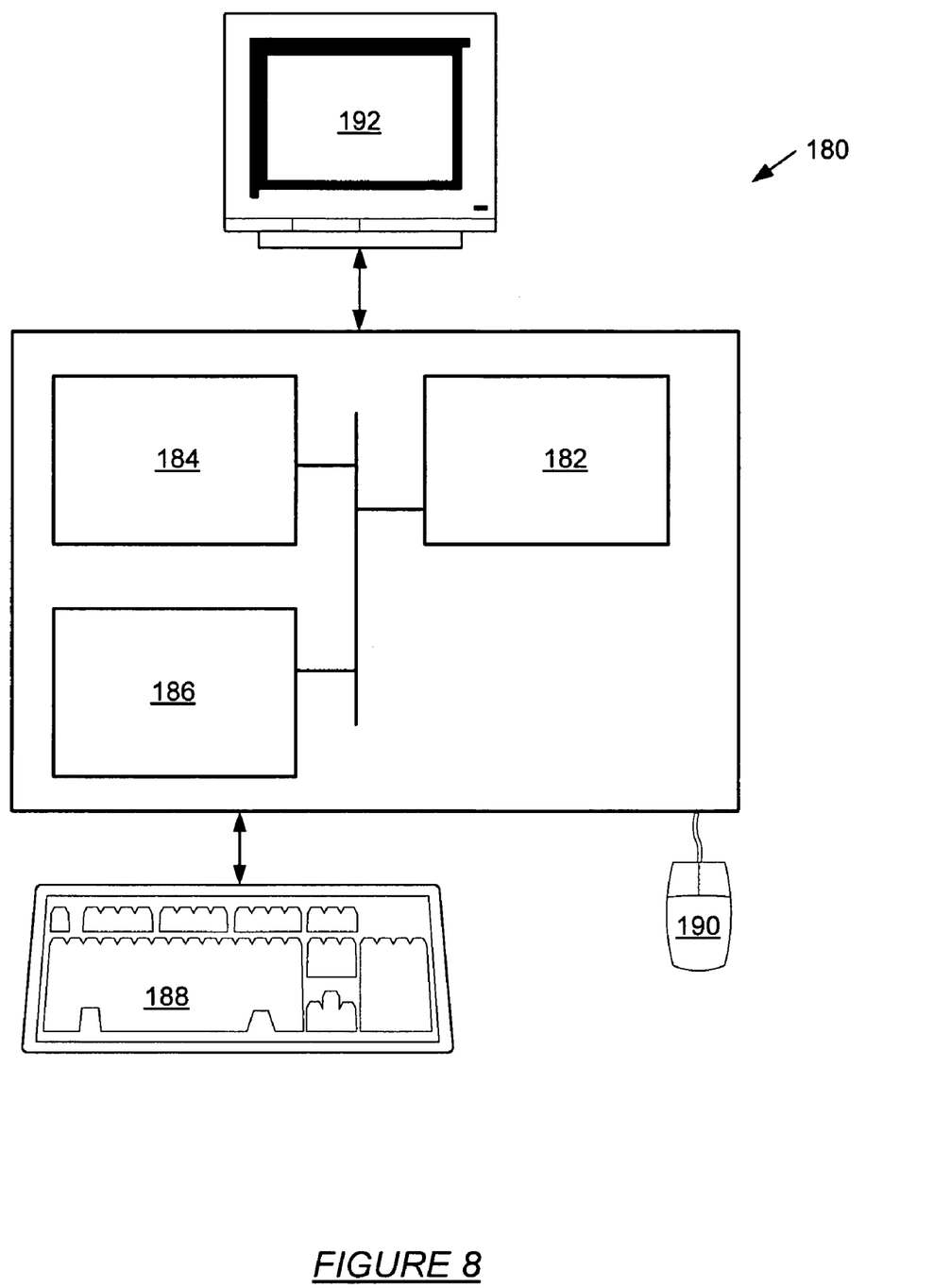
FIG. 8 shows a computer system in accordance with an embodiment of the invention.

The invention may be implemented on virtually any type of computer regardless of the platform being used. For example, as shown in FIG. 8 a networked computer system (180) includes a processor (182), associated memory (184), a storage device (186), and numerous other elements and functionalities typical of today's computers (not shown). The networked computer system (180) may also include input means, such as a keyboard (188) and a mouse (190), and output means, such as a monitor (192). The networked computer system (180) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (180) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for allocating a root block in file system metadata, comprising:
    traversing the file system metadata to locate a non-filled leaf block,
        wherein the non-filled leaf block comprises a plurality of root blocks and at least one of the plurality of root blocks is unallocated,
        wherein the file system metadata comprises a plurality of meta indirect blocks,
        wherein a first meta indirect block of the plurality of meta indirect blocks comprises a pointer to the non-filled leaf block and a first fill count associated with the non-filled leaf block,
        wherein the first fill count corresponds to a number of allocated root blocks in the non-filled leaf block, and
        wherein locating the non-filled leaf block comprises determining that the first fill count is less than a maximum fill count;
    traversing the non-filled leaf block to locate an unallocated root block of the plurality of root blocks; and
    allocating the unallocated root block to obtain an allocated root block;
    wherein a second meta indirect block of the plurality of meta indirect blocks comprises pointers to the first meta indirect block and a third meta indirect block of the plurality of meta indirect blocks,
    wherein the second meta indirect block further comprises a second fill count,
    wherein the third meta indirect block comprises a third fill count, and
    wherein the second fill count is a sum of the first fill count and the third fill count.

2. The method of claim 1, further comprising:
    updating the first fill count after allocating the unallocated root block.

3. The method of claim 1, wherein the first fill count is a non-negative integer.

4. The method of claim 1, wherein the allocated root block references a hierarchical tree corresponding to a file.

5. The method of claim 4, wherein the hierarchical tree comprises a data block and an indirect block, wherein the indirect block directly references the data block, and wherein the allocated root block indirectly references the indirect block.

6. The method of claim 1, wherein the file system metadata is organized in a hierarchical tree.

7. The method of claim 1, wherein the maximum fill count is less than 25 percent of the plurality of the root blocks.

8. The method of claim 1, further comprising:
    updating the second fill count after allocating the unallocated root block.

9. A system, comprising:
    a data processor;
    a storage pool comprising:
        a non-filled leaf block, wherein the leaf block comprises a plurality of root blocks and at least one of the plurality of root blocks is unallocated, and
        file system metadata comprising a plurality of meta indirect blocks, wherein a first meta indirect block of the plurality of meta indirect blocks comprises a pointer to the non-filled leaf block and a first fill count associated with the non-filled leaf block, wherein the first fill count corresponds to a number of allocated root blocks in the non-filled leaf block;
    the data processor configured with instructions for a file system configured to:
        traverse the file system metadata to locate the non-filled leaf block, wherein locating the non-filled leaf block comprises determining that the first fill count is less than a maximum fill count,
        traverse the non-filled leaf block to locate an unallocated root block of the plurality of root blocks, and
        allocate the unallocated root block to obtain an allocated root block;
        update the first fill count after allocating the unallocated block;
        and wherein the first fill count is a non-negative integer.

10. The system of 9, wherein the allocated root block references a hierarchical tree corresponding to a file.

11. The system of 10, wherein the hierarchical tree comprises a data block and an indirect block, wherein the indirect block directly references the data block, and wherein the allocated root block indirectly references the indirect block.

12. The system of 9, wherein the file system metadata is organized in a hierarchical tree.

13. The system of 9, wherein the maximum fill count is less than 25 percent of the plurality of the root blocks.

14. The system of claim 9,
    wherein a second meta indirect block of the plurality of meta indirect blocks comprises pointers to the first meta indirect block and a third meta indirect block of the plurality of meta indirect blocks,
    wherein the second meta indirect block further comprises a second fill count,
    wherein the third meta indirect block comprises a third fill count, and
    wherein the second fill count is a sum of the first fill count and the third fill count.

15. The system of claim 14, wherein the file system is further configured to:
    update the second fill count after allocating the unallocated root block.

* * * * *